United States Patent [19]

Wentworth

[11] 3,796,948

[45] Mar. 12, 1974

[54] STANDING WAVE DETECTOR

[75] Inventor: Frederick L. Wentworth, Baldwin, Md.

[73] Assignee: Westinghouse Electric Corporation, Pittsburgh, Pa.

[22] Filed: July 25, 1972

[21] Appl. No.: 274,930

[52] U.S. Cl.............................................. 324/58 B
[51] Int. Cl............................................. G01r 27/04
[58] Field of Search............ 324/58 B, 58 R, 58.5 B

[56] References Cited
UNITED STATES PATENTS

| | | | |
|---|---|---|---|
| 3,233,172 | 2/1966 | Luoma | 324/58 B |
| 2,605,323 | 7/1952 | Samuel | 324/58 B |
| 2,862,200 | 11/1958 | Shepherd et al. | 324/58.5 B X |
| 3,133,245 | 5/1964 | Shively | 324/58 B |
| 3,238,451 | 3/1966 | Shively | 324/58 B |
| 3,403,335 | 9/1968 | Couper et al. | 324/58 B |

FOREIGN PATENTS OR APPLICATIONS 1,070,370   6/1967   Great Britain .................... 324/58 B Primary Examiner—Stanley T. Krawczewicz
Attorney, Agent, or Firm—J. B. Hinson

[57] ABSTRACT

A system and a method for determining the impedance of a given microwave device by measuring the standing wave in a transmission line is disclosed. A section of transmission line having a plurality of field-sensing probes therein is disposed between an RF signal source and the device. The output signals of these probes are sampled by the system, and the device impedance in terms of the reflection coefficient and the standing wave ratio are calculated using a mathematical process and a digital computer. The frequency of the RF source is variable permitting the measurements to be made over a predetermined frequency range.

8 Claims, 6 Drawing Figures 3,796,948

STANDING WAVE DETECTOR

FIELD OF THE INVENTION

The invention relates to RF impedance measurements, and more particularly, to the methods and apparatus for determining the reflection coefficient and the standing wave ratio in transmission lines.

SUMMARY OF THE INVENTION

The preferred embodiment of the system includes apparatus for sampling the RF field along a transmission line disposed between an RF signal source and a given unit under test (UUT). A programmable RF signal source permits measurements to be made over a preselected frequency range. The system also includes a digital computer for controlling the system and for calculating the reflection coefficient and the standing wave ratio of the transmission line.

A stored program residing in the digital computer controls the frequency selection of the RF test signal and apparatus which measures the frequency and the voltage using field sensing probes. Using these data and the location of the probes (with respect to the input terminal of the UUT) the reflection coefficient and the standing wave ratio of the UUT are calculated by the digital computer. Two algorithms for calculating the reflection coefficient and the standing wave ratio, one iterative and the other direct, are disclosed.

The iterative process solves the standing wave equation by successive approximations, alternating between the magnitude and phase angle of the reflection coefficient. This technique provides a capability for full range measurement of reflection coefficient (0 to 1.0).

The direct algorithm achieves a simultaneous solution of the standing wave equation using the measured signals at the given probe locations. The direct process has the important advantage of being unaffected by changes in test signal amplitude after calibration. The iterative process is preferred for measuring reflection coefficients greater than 0.5 because at these high values the direct method is less accurate.

More specifically, the disclosed invention provides apparatus and method for automatically collecting data and solving the following equation for the reflection coefficient of the UUT.

$$P = 1 + R^2 - 2R\cos(2BL - A)$$

where the terms of the above equation are defined as follows:

$P = $ The normalized output signal amplitude of a RF field sensing probe positioned in the transmission line.
$R = $ The magnitude of the reflection coefficient.
$A = $ The phase angle of the reflection coefficient.
$B = $ Propagation constant of the transmission line.
$L = $ Distance from a reference plane to the RF field sensing probe.

The voltage standing wave ratio (VSWR) is then calculated from the reflection coefficient (R):

where $VSWR = 1 + R/1 - R$

DESCRIPTION OF THE DRAWINGS

FIG. 2A is a schematic diagram of an RF probe.

DETAILED DESCRIPTION

Figure 1:
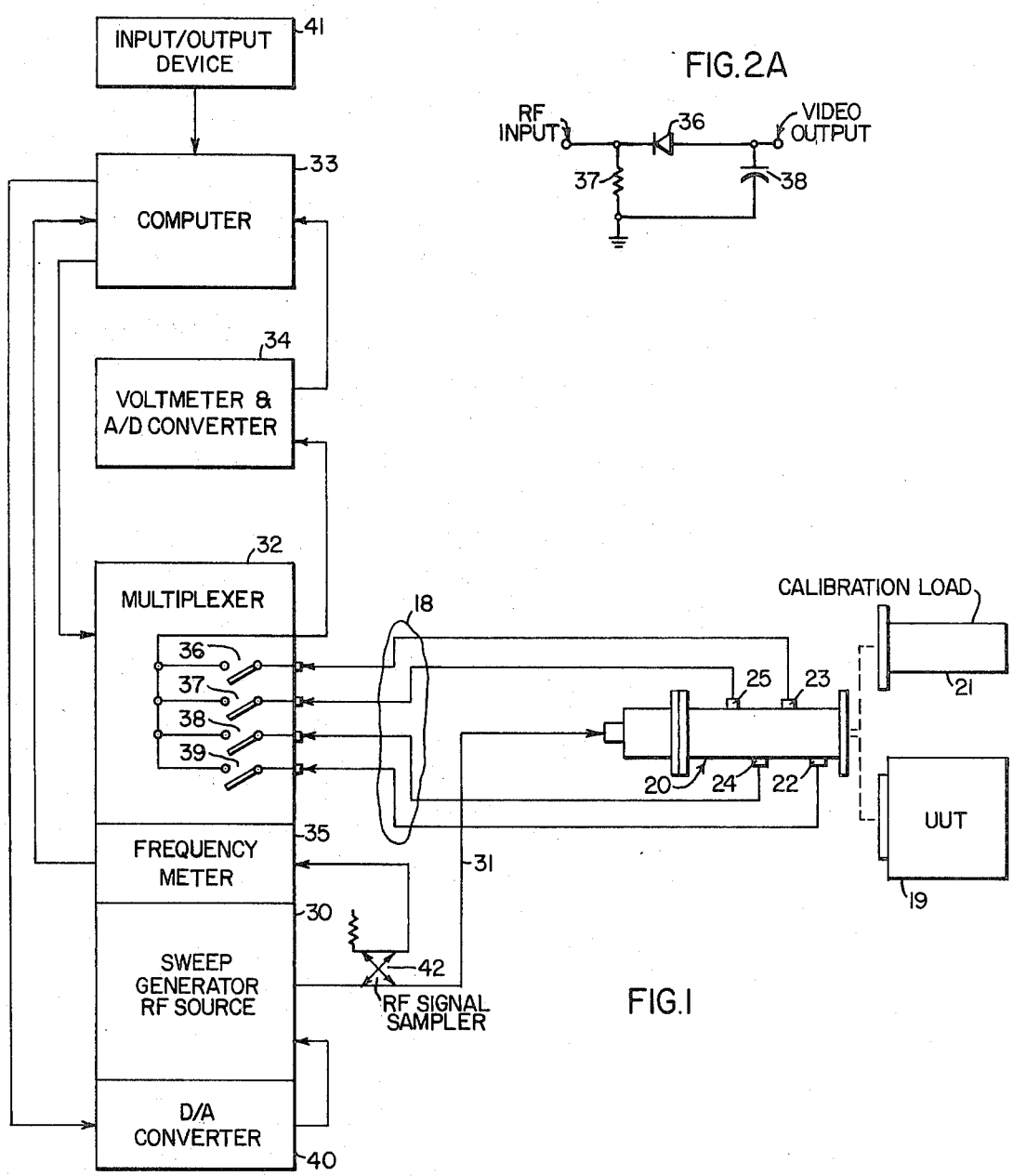
FIG. 1 is a somewhat diagrammatic drawing of the preferred embodiment of a system for determining the reflection coefficient and the standing wave ratio of a transmission line.

FIG. 1 is a drawing illustrating the equipment comprising the standing wave detector system. The illustrated system is designed to calculate the reflection coefficient and the standing wave in a rectangular waveguide based on the output signals of RF field sampling probes which are positioned in the waveguide. The system can be easily modified for use with other types of transmission lines, such as a coaxial line, for example.

The system illustrated in FIG. 1 includes a special section of waveguide 20. The output end of this waveguide is connected to either the calibration load 21 or the unit under test (UUT) 19 depending on whether the system is being calibrated or a measurement is being made. The waveguide 20 includes four RF field detecting probes 26 through 29 (FIG. 2) which produce signals indicative of the RF fields present at predetermined locations along the waveguide 20. Probes 26 and 27 are positioned on one side of the waveguide 20, while probes 28 and 29 are positioned on the opposite side of the waveguide 20 with the two sets of probes offset from each other. The signals from the probes, 26 through 29, are coupled to terminals 22 through 25. The input end of the waveguide 20 is coupled to an RF source 30 by a coaxial cable 31. The coaxial cable 31 is purely a matter of convenience. A section of waveguide could be used if the system was suitably modified. Each of the terminals 22 through 25 are connected to a multiplexer 32 by a multiconductor cable 18.

The multiplexer 32, which is controlled by the digital computer 33, selects and couples one of the signals from probes 26 through 29 to the voltmeter 34 which includes an analog to digital (A/D) converter. The output of the voltmeter 34 is coupled to the digital computer 33. A digital signal indicative of the frequency of the RF source 30 is generated by a frequency meter 35 and coupled by a cable to the digital computer 33. The digital computer 33 also controls a digital to analog (D/A) converter 40, which in turn controls the frequency of the RF source 30. An input/output device 41 provides means for entering programs and control signals into the digital computer 33 and for extracting final computed results from the digital computer 33. By properly programming the digital computer 33, the system illustrated in FIG. 1 can be used to sample the output signals of probes 26 through 29 (FIG. 2), the output signal of the frequency meter 35 and utilize these signals for calculating the reflection coefficient and the standing wave ratio in the waveguide 20 over a predetermined frequency range.

Figure 2:
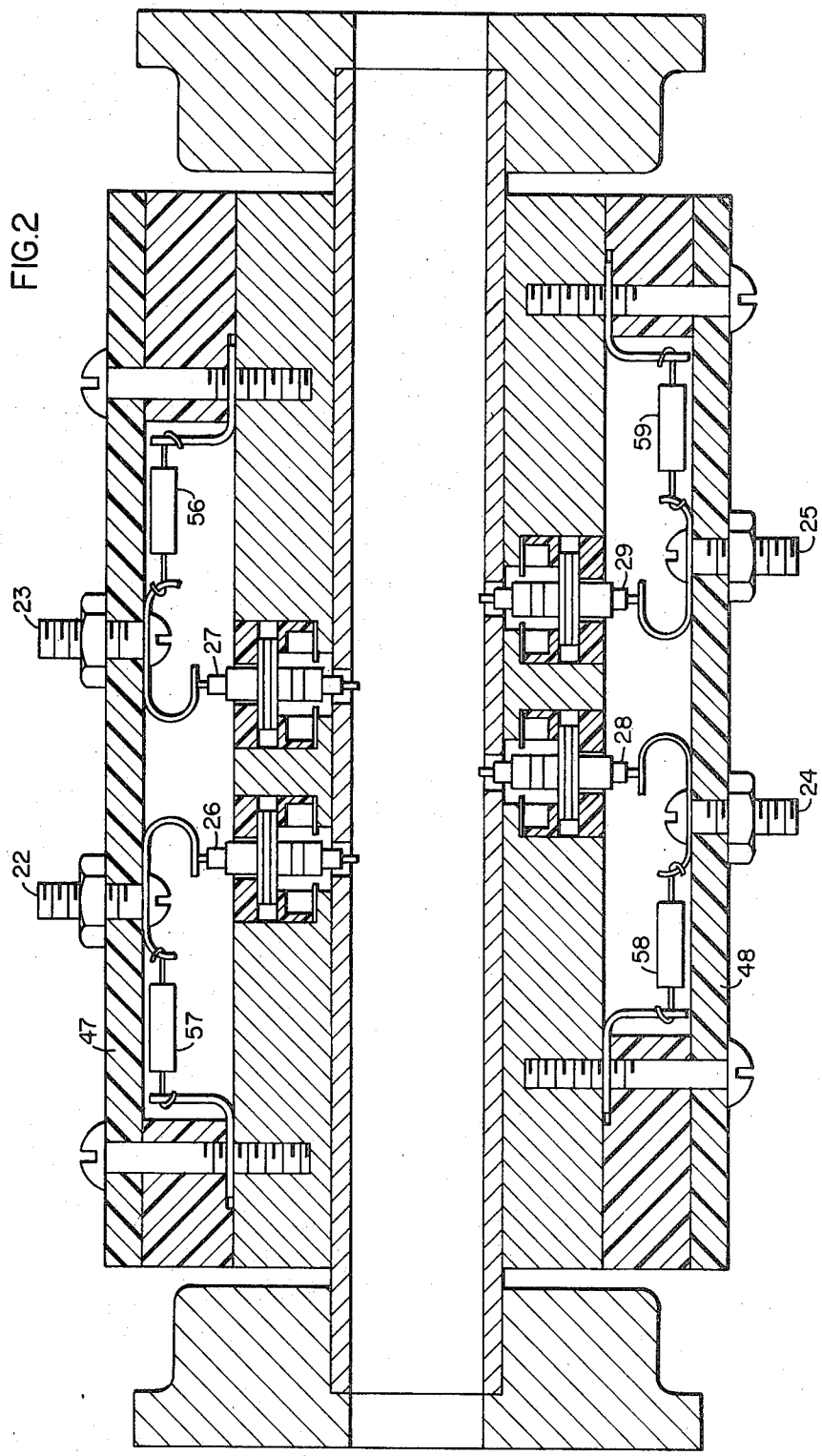
FIG. 2 is a cross-section view of a section of rectangular waveguide including RF field sensing probes and detectors.

FIG. 2 illustrates the waveguide section 20 in cross-section. From this illustration it can be seen that the probes 26 through 29 are spaced in staggered relationship along opposite sides of the waveguide 20. This configuration is purely a matter of convenience because at X-band frequency the probes 26 through 29 are generally too large to permit all the probes 26 through 29 to be mounted in one wall and still achieve the proper spacing between the individual probes.

The spacing between adjacent probes is preferably chosen such that it is within the range of 0.06 to 0.2 wavelengths at the test frequency used. The output signals of the probes 26 through 29 are coupled to terminals 22 through 25, respectively. These terminals provide a convenient means of coupling the multiplexer 32 to the probes so that the output signals of the probes can be sampled.

The computer 33, the voltmeter with A/D converter 34, the multiplexer 32, the frequency meter with A/D converter 35, the RF source 30 and the digital to analog converter 40 may be standard, commercially available units.

The probes, 26 through 29, are preferably Hewlett-Packard 00424 diodes mounted in the waveguide 20. The output signal of each of these diodes available at terminals 22 through 25, is proportional to the square of the RF field voltage existing at the point where the diodes penetrate the side wall of the waveguide 20.

A schematic diagram of the Hewlett-Packard 00424 diodes is shown in FIG. 2A. The diode includes a rectifying PN junction 36, a DC return resistor 37 and a filter capacitor 38. When the diode is mounted in the waveguide 20 as illustrated in FIG. 2, the common terminal of the resistor 37 and the capacitor 38 are connected to the wall of the waveguide 20 through a terminal which is a portion of the diode package. Terminals 22 through 25 are mounted in electrically insulating members 47 and 48 and coupled to probes 26 through 29. Resistors 56 through 59 are connected from terminals 23 through 25 to the wall of the waveguide 20. The value of each of these resistors is selected to optimize the square law response of the probes. These resistors may be deleted if optimum squarelaw response is not desired. Deleting these resistors also increases the output signal of the diodes.

The operation of the system shown in FIG. 1 will now be explained in detail, assuming that the system has been previously calibrated. Calibration of the system will be subsequently described, in detail.

A measurement cycle is initialized by the operator with start instructions sent to the digital computer 33 via the input/output device 41 (FIG. 1). The input/output device 41 can be a keyboard, an array of pushbuttons or any other suitable device. Subsequent steps in the measurement cycle are initialized via computer control in accordance with programmed instructions residing in the computer memory.

The first step of the measurement cycle is to set the RF test frequency according to the start instructions included in the computer program. The computer 33 sends to the digital to analog (D/A) converter 40 a digital signal representative of a requested test frequency. The D/A converter which is connected to the RF sweep generator 30 delivers an analog voltage which sets the frequency of the RF sweep generator 30. A small portion of the RF signal output is coupled by the RF signal sampler 42 to the frequency meter 35 via coax cable. A digital signal indicative of the measured frequency is sent by the frequency meter 35 to the computer 33 which compares the frequency measured with the frequency requested. If the frequencies differ, the computer 33 sends a revised digital signal to the D/A converter 40 which in turn delivers a corrected analog voltage for setting the corrected frequency of the RF sweep generator 30. This frequency setting process is repeated until some predetermined tolerance between the measured frequency and requested frequency is satisfied.

The next step in the program is to sample the output voltages of each of the probes 26 through 29. The sampling cycle is initiated by the digital computer 33 sending to the multiplexer 32 a signal indicating which one of the probes 26 through 29 is to be coupled to the voltmeter 34. The signal closes one of the switches 36 through 39, thereby coupling the analog signal from the selected probe to the voltmeter 34. A digital number representative of the analog output signal of the selected probe is generated in the voltmeter 34, and sent to the digital computer 33. This sampling cycle is repeated until each of the output signals of the probes 26 through 29 has been sampled and digital number representative of these signals stored in the memory of the digital computer 33.

The next step of the program is the computation of the UUT impedance which can be expressed in terms of the magnitude and phase angle of the reflection coefficient, the VSWR, or any other suitable parameters according to the design of the computer program.

The final step in the program is to deliver the results of the measurement to the input/output device 41 which can be a printer, digital display or any other suitable visual display.

Figure 3:
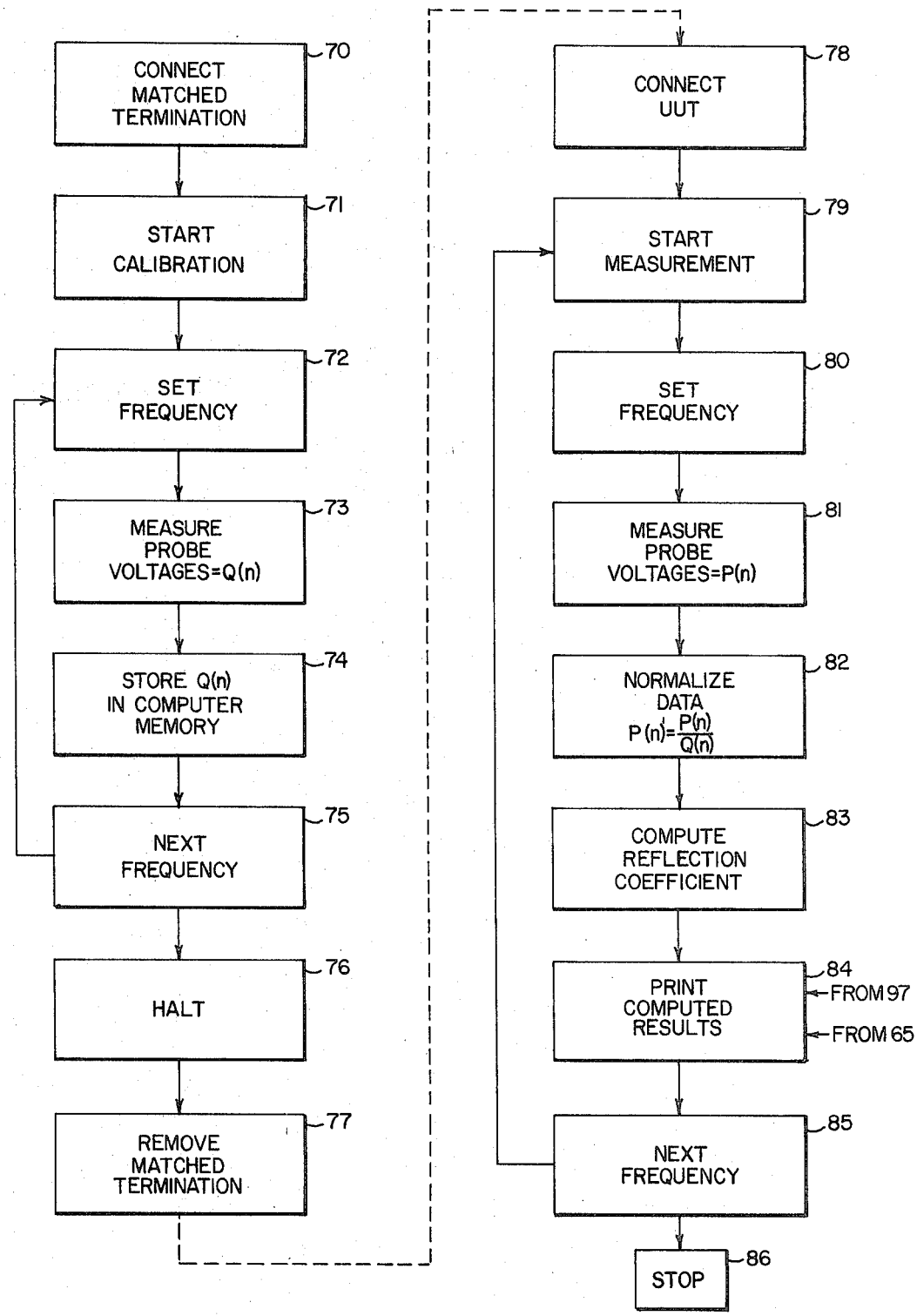
FIG. 3 is a flowchart illustrating the functional steps necessary to calibrate the system and make RF measurements.

The procedure for determining the impedance of a microwave device including the preliminary step of calibrating the standing wave detector system will now be described in detail with reference to FIG. 3. FIG. 3 is a flowchart of the calibration and measurement procedures using the system illustrated in FIG. 1. This flow chart is generalized to define the procedures in terms of the functions performed.

The first step of the calibration procedure is the connection of a matched termination 21 to the output port of the waveguide section 20 as indicated in FIG. 1. This step is functionally illustrated at reference numeral 70 of FIG. 3. The calibration cycle is initialized by the operator with start instructions sent to the computer via the input/output device. The start instructions typically include the desired frequencies and other special conditions of the test. The computer sets the test frequency and then measures the probe voltages. The probe voltages obtained in the calibration cycle (designated $Q(n)$) are stored in the computer memory for future recall during the measurement cycle. These steps are illustrated at reference numeral 71 through 74 of FIG. 3. At reference numeral 75, the process is returned to the step illustrated at reference numeral 72 to set the next frequency for calibration. The calibration process of steps 72, 73, 74 and 75 are continued until the system has been calibrated at all frequencies to be used in performing subsequent test. Upon completion of the calibration the program halts at step 76. The operator then removes the matched termination and connects the UUT. These steps are illustrated at reference numerals 76 through 78.

The measurement cycle is initialized by the operator with start instruction sent to the computer via the input/output device 41. The start instructions need be only a proceed signal or can include additional processing instructions; however, the start instructions cannot request test frequencies for which calibration has not already been made. This step is illustrated functionally at reference numeral 79 of FIG. 3.

In the first step of the measurement cycle the computer sets the test frequency and then measures the output voltages of the probes. These voltages (designated P($n$)) are normalized by dividing each P($n$) value with the corresponding Q($n$) value according to the test frequency and probe position ($n$); thus, $P'(n) = P(n)/Q(n)$. These steps are illustrated at reference numeral 81 and 82. The computer then executes a computational routine which is a mathematical process for reducing the measured data to an expression of impedance for the UUT. A detailed description of two computational routines will be described in the following section. This step is illustrated at reference numeral 83.

The next step is to deliver the results of the impedance measurement in a usable form to the operator and return to the beginning of the cycle where the next frequency to be used in making measurements is set. The measurement process continually cycles through the steps, functionally, illustrated at reference numerals 79 through 85, until measurements have been made at all frequencies designated by the "start measurement" step, illustrated at reference numeral 79. When measurements have been made at all the requested frequencies, the process stops, as illustrated functionally at reference numeral 86.

When a plurality of devices are to be measured under the same test conditions the calibration cycle need not be repeated for each. The process can be entered directly at the point where the UUT is connected to the system. This step is illustrated functionally at reference numeral 78.

The computational routine for reducing the measured data to parameters expressing impedance is illustrated at Step 83, FIG. 3. The routine can be organized in an unlimited number of ways. In general the routine solves the standing wave equation to fit the measured amplitude of the standing wave created by the UUT.

Two algorithms, one iterative and the other direct, will now be described in detail with reference to functional flowcharts FIG. 4 and FIG. 5 respectively. RF impedance is uniquely given for a position along the transmission line which includes the test port input of the UUT. A convenient impedance reference plane is the output end of the standing wave detector 20 which is typically connected to the input terminal of the UUT. Data indicative of the distance from the reference plane to each of the probes 26 through 29 resides in the computer program. These distance values are respectively associated with the normalized probe voltages, $P'(n)$, be obtained by the step illustrated functionally at reference numeral 82 FIG. 3, by the use of common subscript numerals.

The first step in the iterative process is to select the maximum $P'(n) = P'(max)$. From $P'(max)$, an estimated value of $R$ (the magnitude of the reflection coefficient) is calculated by assuming that the cosine term in the following equation has its maximum value of $+1.0$.

$$P'(n) = 1 + R^2 + 2R \cos(2BL(n) - A) \quad (1)$$

thus $$R = -1 + \sqrt{P'(max)} \quad (2)$$

Figure 4:
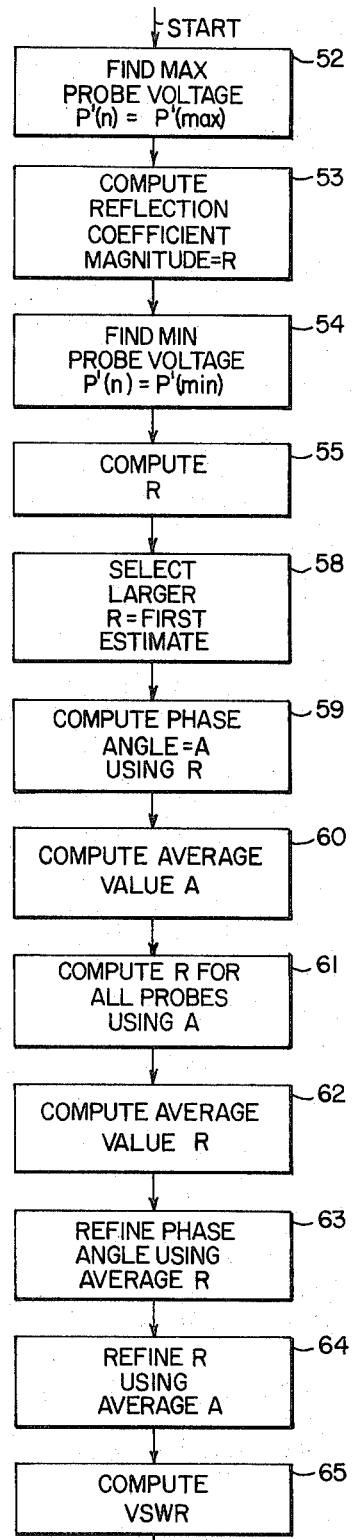
FIG. 4 is a detailed flowchart of an iterative process for computing the reflection coefficient of a transmission line.
Figure 5:
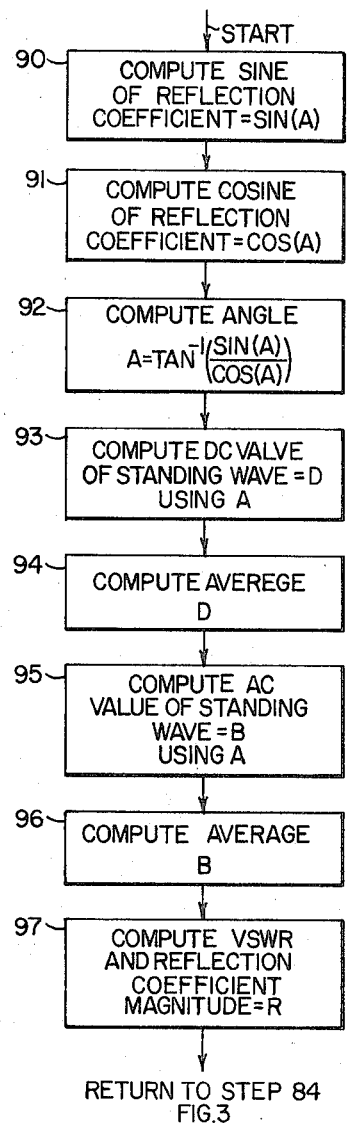
FIG. 5 is a detailed flowchart illustrating a direct process for computing the reflection coefficient and the standing wave ratio of a transmission line.

These two functional steps are illustrated at reference numerals 52 and 53, FIG. 4, respectively.

The minimum $P'(n)$ is now selected. From $P'(min)$ a second estimated value of $R$ is calculated by assuming that the cosine term referenced in the equation (1) above has its minimum value of $-1$. Thus, $$R = 1 - \sqrt{P'(min)} \quad (3)$$

These two functional steps are illustrated at reference numeral 54 and 55 respectively.

From the two values of R, calculated above, the largest value is selected as a first estimate of R which is then substituted into equation (1) above. This equation is solved simultaneously for phase angle A, using as data the voltage signals and distance for two of the probes. These steps are illustrated at reference numerals 58 and 59. As a practical procedure, when four probes are used, step 59 is performed three times, the first time using probes $n = 1$ and 2, then using probes $n = 2$ and 3, and finally, using probes $n = 3$ and 4. The resulting three values of A are then averaged to minimize the effect of errors in the voltage measurements. This step is illustrated at reference numeral 60.

After the phase angle has been computed, it is substituted into the equation (1) above and the value of R is again calculated using values of $P'(n)$ obtained at each of the probes. All the values for R calculated using this phase angle, are averaged. This average value is then used to recalculate the phase angle of the reflection coefficient, thereby improving the accuracy of the calculation. These steps are shown at reference numerals 61, 62 and 63. The refined values for the phase angle are again substituted into equation (1) and new values for R are calculated. The step for recalculating the value of R is shown at reference numeral 64. Steps 63 and 64 may be repeated as many times as necessary to reach the optimum solution. However, a practical limitation on the accuracy of the calculations may be imposed by probe spacing and other equipment related errors. The voltage standing wave ratio is calculated from the reflection coefficient magnitude using the following equation.

$$VSWR = 1 + R/1 - R$$

This step is illustrated functionally at reference numeral 65.

The values for R, A and VSWR are printed out on a data printer or other suitable output device (41) FIG. 1, then the measurement cycle either returns to the beginning of a new measurement illustrated functionally at reference numeral 79 (FIG. 3) or is terminated. These steps are illustrated at reference numerals 84, 85 and 86 in FIG. 3.

In the direct process the voltage output signals and distance data for three probes are applied to the standing wave equation (1) to give three equations which are solved simultaneously for the phase angle A. The solution of angle A avoids a quadrant ambiguity by first solving for the sine (A) and the cosine (A) as illustrated at reference numerals 90 and 91, FIG. 5. Angle A is then found by solving:

$$A = \text{Tan}^{-1}(\text{Sin}(A)/\text{Cos}(A)) \quad (4)$$

where the sign of both sine (A) and cosine (A) determine the quadrant. This step is illustrated at reference numeral 92.

The standing wave voltage is composed of a DC component (D). And a periodic component which has an amplitude (B). In the next step, the value A found in step 92 is applied to the equation (1) and, using the voltage and distance data for two probes, two new equations are generated. These equations are solved simultaneously for both the DC component (D) and the amplitude of the periodic component (B). These two steps are illustrated at functionally reference numerals 93 through 96. Steps 93 and 95 are executed three times, first using probes $n = 1$ and 2, then using probes $n = 2$ and 3 and finally using probes 3 and 4. In steps 94 and 96 the average values of D and B are calculated thus reducing the effect of voltage measurement errors.

The computation of VSWR and reflection coefficient magnitude $R$ are performed at step 95 according to the following equations:

$$\text{VSWR} = \sqrt{D+B/D-B} \quad (5)$$

and $$R = \text{VSWR} - 1/\text{VSWR} + 1 \quad (6)$$

The values for $R$, $A$ and VSWR are printed out on a data printer or other suitable output device (41) FIG. 1, then the measurement cycle either returns to step 80 or is terminated. These steps are shown at reference numerals 84, 85 and 86 FIG. 3.

The following program is a program for a digital computer, and it is written in a widely used compiler language known as "Basic." This program is an example of the iterative process designed to cycle through the previously described calculation sequence for two cycles and has been found to give results comparable to carefully made measurements with a waveguide slotted line.

```
        Y3FW11       16:17       CEIR       09/17/69
Input:
    100 Print "Reflection coefficient-R, angle A-vs standing wave DA
    110 Print
    120 Print "Give 4 probe locations, L( ), in inches"
    130 Input L(1), L(2), L(3), L(4)
    140 Print "Give 4 input values of P( )"
    150 Input P(1), P(2), P(3), P(4)
    160 Print "Give test freq. in ghz."
    170 Input F
Find max P(x) and compute R:
    180 Let M=P(1)
    190 Let N=1
    200 For J=2 to 4
    210 If M>P(J) then 240
    220 Let M=P(J)
    230 Let N=J
    240 Next J
    250 Print "Max. P( ) at L("N")"
    260 Let R=-1+SQR(M)
Find min P(x) and compute R:
    270 Let M1=P(1)
    280 Let X1=1
    290 For J=2 to 4
    300 If M1<P(J) then 330
    310 Let M1=P(J)
    320 Let X1=J
```

```
        Y3FW11       16:17       CEIR       09/17/69
    330 Next J
    340 Print "Min. P( ) at L("X1")"
    350 Let R1=1-SQR(M1)
    360 Let X2=0
Select max R and compute VSWR:
    370 If R>R1 then 410
    380 Let R=R1
    390 Let N=X1
    400 Let X2=1
    410 Let R1=(1+R)/(1-R)
    420 Let A=0
    430 Let A1=0
    440 Let R2=0
    450 Let V=1
    460 Print
    470 Print "VSWR           R"
    480 Print R1, R
Phase angle—First loop: Compute values on R(1). Second loop: Compute values on P(3):
    490 Let Q=SQR(F↑Z-43)
    500 Print
    510 Let B(V)=1.065*L(V)*Q-A/57.3
    520 Print "B(V)="B(V)
    530 Let C(V)=COS(B(V))
    540 Print "COS (B(V))="C(V)
    550 Let S(V)=sin (B(V))
    560 Print "sin(B(V))="S(V)
    570 Let K(V)=(P(V)-1-R↑2)/(2*R)
    580 Print "K("V")="K(V)
First loop: Compute values P(2). Second loop: Compute values P(4):
    590 Let W=V+1
    600 Let B(W)=1.065*L(W)*Q-A/57.3
    610 Print "B(W)=";B(W)
    620 Let C(W)=COS(B(W))
    630 Print "Cos(B(W))=";C(W)
    640 Let S(W)=sin(B(W))
    650 Print "sin(B(W))=";S(W)
    660 Let K(W)=(P(W)-1-R↑2)/(2*R)
    670 Print "K("W")="K(W)
Determinant:
    680 Let D=C(V)*S(W)-C(W)*S(V)
    690 Print "D="D
Compute A=cos⁻¹ (T) Get two angles G&H:
    700 Let T=(K(V)*S(W)-K(W)*S(V))/D
    710 Print "T="T
    720 If ABS(T)<1 then 760
    730 Let T=SGN(T)
    740 Let A=0
    750 GOTO 800
    760 Print "T="T
    770 Let X=ABS(T)
    780 Let E=5.93-SQR(12+23.1,649*X)
    790 Let A=SQR(E)
    800 Let G=57.3*A
    810 Let H=-G
    820 If T<0 then 840
    830 GOTO 860
    840 Let G=180-G
    850 Let H=-G
Compute A=sin⁻¹ (U) Get two angles Y&Z:
    860 Let U=(C(V)*K(W)-C(W)*K(V))/D
    870 Print "U="U
    880 If ABS(U)<1 then 920
    890 Let U=SGN(U)
    900 Let A=1.5708
    910 GOTO 1000
    920 Print "U="U
    930 Let X=ABS(U)
    940 Let A=ABS(U)
    950 Let E=sin(A)
    960 Print "E="E
    970 If (X-E)<.005 then 1000
    980 Let A=A+X-E
    990 GOTO 950
    1000 Let Y=57.3*A
    1010 Let Z=180-Y
    1020 If U<0 then 1040
    1030 GOTO 1060
    1040 Let Y=-Y
    1050 Let Z=-Z
Resolve ambiguity between A=COS'(T) and A=sin'(U) G/H VS y/z:
    1060 If SGN(T)=SGN(U) then 1140
    1070 If ABS(Z-G) < ABS(H-Y) then 1110
    1080 Print "H=" H, "Y="Y
    1090 Let A=(H+Y)/2
    1100 GOTO 1200
    1110 Print " G="G, "Z="Z
    1120 Let A=(G+Z)/2
    1130 GOTO 1200
    1140 If ABS(Z-H) <ABS(Y-G) then 1180
    1150 Print " G="G,"Y="Y
    1160 Let A=(G+Y)/2
    1170 GOTO 1200
    1180 Print "H="H, "Z="Z
    1190 Let A=(H+Z)/2
Refines angle on 2nd pass:
    1200 Let A=A+A1
    1210 Print "A="A
Refines R after first pass:
    1220 Let J=B(N)-A/57.3
    1230 Print "J="J
    1240 Let I=cos(J)
    1250 Print "I="I
    1260 If X2=1 then 1290
    1270 Let R2=I+SQR(I↑2+M+1)
    1280 GOTO 1310
    1290 Let R2=-I-SQR(I↑2+M1+1)
    1300 Let R=(R+R2)/2
Return instruction for 2nd pass:
    1310 If V=3 then 1360
    1320 Let A1=A
    1330 Let V=3
    1340 Print "R="R
```

```
Y3FW11        16:17        CEIR        09/17/69
1350 GOTO 510
Final printout:
    1360 Let R1=(1+R)/(1-R)
    1370 Print "R=",R, "Angle=",A, "VSWR=",R1
    1380 Print "To run again type 1, if not type 0"
    1390 Input 0
    1400 If 0=1 then 140
    1410 End
```

The above program only makes a measurement at one frequency. If the measurements are to be made over a number of frequencies, the program may be modified to include control signals for changing the frequency of the RF source 30. Program techniques for performing this type of operation are well known and are therefore not included here.

The above described equipment is not limited to any specific type of transmission line or frequency range. However, the spacing of the probes is preferably selected such that the phase change in the standing wave between any two adjacent probes is in the range of 30° to 150°.

What we claim is:

1. A method for determining the standing wave ratio on a transmission line, comprising the steps of:
    a. connecting a section of transmission line, having a plurality of voltage sampling probes therein, between a signal source and a matched load;
    b. sampling the voltage output signals of each of said probes to obtain a first set of signals indicative of the voltage distribution along said transmission line;
    c. terminating said section of transmission line with a test load and sampling the output voltage of each of said probes to obtain a second set of voltage signals indicative of the voltage distribution along said transmission line;
    d. normalizing said second set of signals by dividing each of said signals by the corresponding signal in said first set, and
    e. calculating the standing wave ratio by solving the standing wave ratio equation using said normalized values.

2. A method for determining the standing wave ratio on a transmission line, comprising the steps of:
    a. positioning a plurality of field sampling probes in a transmission line with each of said probes being located a known distance from a reference plane;
    b. terminating said transmission line with a resistive load equal to the characteristic impedance of said transmission line;
    c. measuring the output of each of said probes to obtain a first set of values indicative of the field distribution along said transmission line;
    d. terminating said transmission line with the unit under test; and
    e. measuring the output of each of said field detecting probes to obtain a second set of values indicative of the field distribution along said transmission line; and
    f. calculating said standing wave ratio using the following equation:
    $P = 1 + R^2 + 2R \cos(2BL-A)$
    wherein:
    $P$ = the normalized output of a field sampling probe
    $R$ = magnitude of the reflection coefficient
    $A$ = phase angle of the reflection coefficient
    $B$ = propagation constant of the transmission line
    $L$ = distance of the probe from the impedance reference plane.

3. The method of determining the standing wave ratio of a transmission line in accordance with claim 1 wherein the first estimate of $R$ is made by selecting the maximum value of $P$ from a plurality of values for $P$ obtained by sampling the output signals of said field sampling probes and assuming that $\cos(2BL-A) = 1$.

4. The method of determining the standing wave ratio of a transmission line in accordance with claim 3 wherein the average value of $A$ is determined by substituting the value of $R$ determined in accordance with the procedure of claim 4 into the equation:
$P = 1 + R^2 + 2R\cos(2BL-A)$ and using values of $P$ obtained by sampling the output signals of said plurality of selectively positioned probes and averaging all the values of $A$ so determined to obtain an average value of $A$.

5. The method of determining the standing wave ratio of a transmission line in accordance with claim 4 wherein the value of $R$ is refined by substituting the value of $A$ determined by the procedure of claim 5 into the equation $P = 1 + R^2 + 2R\cos(2BL-A)$.

6. The method of determining the standing wave ratio of a transmission line in accordance with claim 5 wherein an average value for R is determined by calculating R for each value of P obtained by sampling the output signals of each of said plurality of probes and averaging the values of R so obtained to determine an average value for R.

7. The method of determining the standing wave ratio of a transmission line where the calculation defined by claim 2 is an iterative process and is repeated until the required accuracy is obtained.

8. The method of determining the standing wave ratio of a transmission line in accordance with claim 2 wherein each of said procedures is controlled by a properly programmed digital computer.

* * * * *